United States Patent
Kang (10) Patent No.: US 6,868,146 B2
(45) Date of Patent: Mar. 15, 2005

(54) INTERNET FAX SYSTEM, TRANSMISSION RESULT ASCERTAINING APPARATUS FOR INTERNET FACSMILE AND RUNNING METHOD OF INTERNET FACSMILE NETWORK

(75) Inventor: Jae Kyung Kang, Kunpo-shi (KR)

(73) Assignee: LG Electronics Inc., Seoul (KR)

( * ) Notice: Subject to any disclaimer, the term of this patent is extended or adjusted under 35 U.S.C. 154(b) by 251 days.

(21) Appl. No.: 09/898,824

(22) Filed: Jul. 3, 2001

(65) Prior Publication Data

US 2002/0034284 A1 Mar. 21, 2002

(30) Foreign Application Priority Data

Sep. 18, 2000 (KR) .......................................... 2000-54588

(51) Int. Cl.⁷ ............................................ H04M 11/00
(52) U.S. Cl. ............................. 379/100.06; 379/100.17; 358/405
(58) Field of Search ................... 379/100.06, 100.05, 379/100.08, 100.12, 100.13, 100.17, 100.01, 90.01; 358/400, 401, 402, 405, 431, 434, 442; 370/352, 356

(56) References Cited

U.S. PATENT DOCUMENTS

| | | | | |
|---|---|---|---|---|
| 5,793,976 A | * | 8/1998 | Chen et al. | ................. 370/351 |
| 5,881,064 A | * | 3/1999 | Lin et al. | .................... 358/431 |
| 6,307,643 B1 | * | 10/2001 | Okada et al. | ............... 358/442 |
| 6,493,105 B1 | * | 12/2002 | Onuma | ....................... 358/402 |
| 6,496,573 B1 | * | 12/2002 | Ichimura | .............. 379/100.06 |
| 6,552,826 B2 | * | 4/2003 | Adler et al. | ........... 379/100.17 |

* cited by examiner

Primary Examiner—Stella Woo
(74) Attorney, Agent, or Firm—Lee, Hong, Degerman, Kang & Schmadeka (57) ABSTRACT

Described are a method of running an internet fax network, an internet fax system, and a transmission result ascertaining module. In the present invention, a transmission message produced when fax data are transmitted is transferred to the receive party with the fax data, and a return message including information about the receive time and state according to the fax data is transmitted to the transmission. Therefore, the transmission party enables to ascertain the transmission state and time of the fax data.

20 Claims, 9 Drawing Sheets

FIG. 1
Related Art

| real-time transmission method | store-forward transmission method | fax/call control |
|---|---|---|
| T.38 | T.37 | |
| UDP / TCP | TCP | phone API |
| OS canal | | |
| system hardware, phone hardware | | |

| transmission party fax number information | receive party fax number information | lost packet count information part | fax transmission time information | fax receive time information part | message identifier information part | transmission state |

FIG. 9

INTERNET FAX SYSTEM, TRANSMISSION RESULT ASCERTAINING APPARATUS FOR INTERNET FACSMILE AND RUNNING METHOD OF INTERNET FACSMILE NETWORK

BACKGROUND OF THE INVENTION

1. Field of the Invention

The present invention relates to an internet fax system, a transmission result ascertaining apparatus for internet fax, a method of running an internet fax network, and a message format for an internet fax.

2. Background of the Related Art

When fax data are transferred using the internet network, reports of transmission result and transmission time of the transferred data as are required for securing reliance of the transmission.

The fax transmission is generally achieved through Public Switched Telephone Network(hereinafter abbreviated PSTN) or Internet Network.

Protocols for transmitting the fax data through the internet network, which are called FoIP(FAX over Internet Protocol), include a store and forward transmission method of transmitting fax files having been stored therein and a real-time transmission method of transmitting the fax files immediately.

Generally, the fax files are tried to transmit by the real-time transmission method first. If this transmission fails, the store and forward transmissions method are executed automatically for the transmission.

In toll fax or international fax transmission, FoIP is different from international fax transmission service, which charges international call fees, using PSTN and fax transmission network.

FoIP is a sort of an internet service technology which enables to reduce greatly the cost for transmission/receive of the fax data globally using the international internet network. Moreover, by evading the PSTN path, FoIP enables to realize additional functions such as transmission security guarantee, routing path of minimum price, dissolution of call stand-by, on-line call report, browser for fax/e-mail. Besides, various marketing points of FoIP can win over lots of customers.

As mentioned in the above explanation, gateways connected to the internet network are essential to realize FoIP. Such gateways are generally installed inside personal computers.

Figure 1:
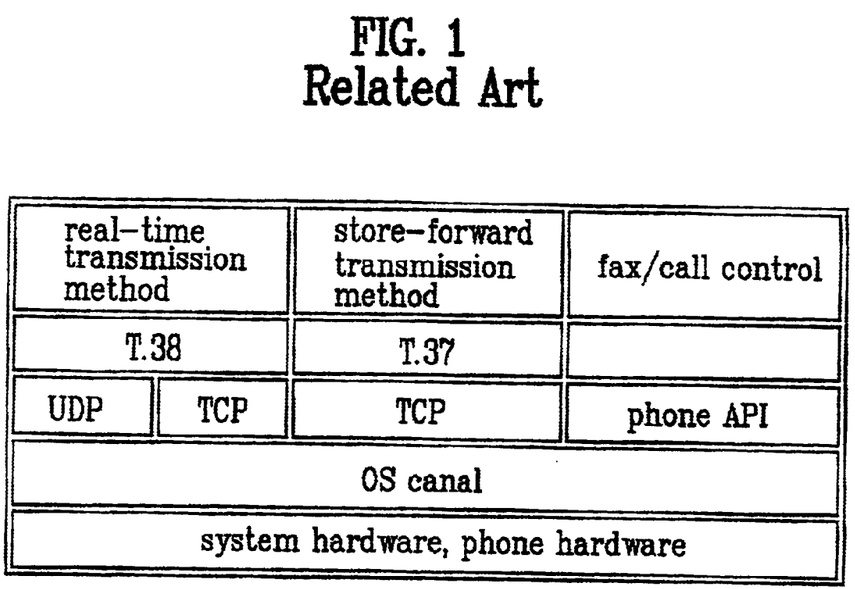
FIG. 1 shows a diagram of a protocol structure of gateways.

FIG. 1 shows a diagram of a protocol structure of gateways.

Referring to FIG. 1, the real-time transmission method transmits fax data using IFP(internet fax protocol), TCP/IP or UDP/IP protocol prescribed in T.38, while the store-forward transmission method transmits the fax data using SMTP(simple mail transport protocol) prescribed in T.37.

Figure 2:
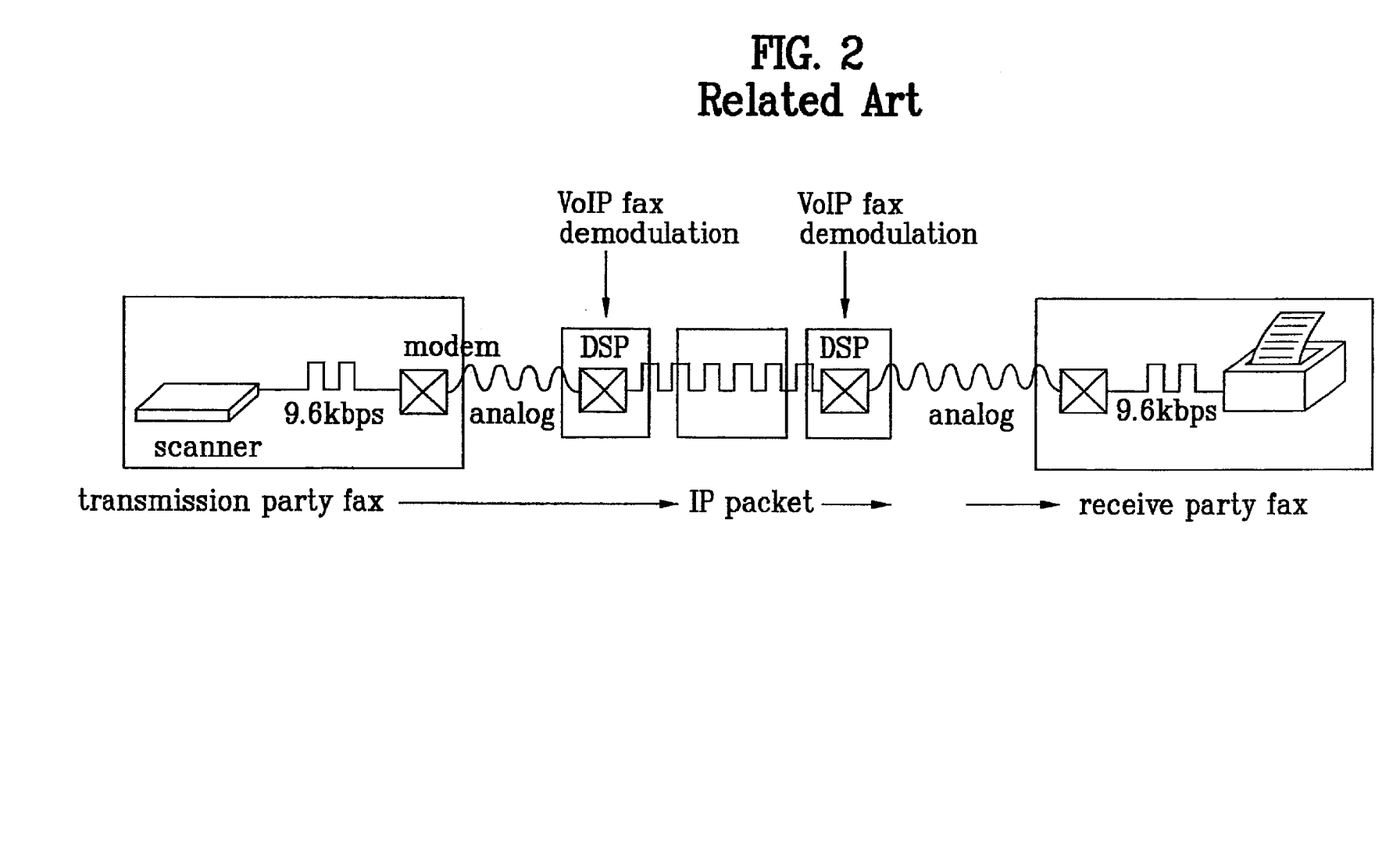
FIG. 2 shows a diagram for explaining schematically a process of fax data transmission through the internet network.

FIG. 2 shows a diagram for explaining schematically a process of fax data transmission through the internet network.

Referring to FIG. 2, analog data produced by an inner scanner of a transmission party fax are converted into digital data of 9.6 kbps so s to be sent to a modem.

Converting the digital data into analog data again, the modem sends the analog data to a gateway of the transmission party through PSTN.

The gateway of the transmission party carries out demodulation installed inside for transmitting the fax analog data through the internet network, whereby the analog data are converted into packet data. Then, the packet data are transmitted to the other gateway of the receive party through the internet network by 9.6 kbps.

The gateway of the receive party remodulates the fax packet data, which have been transmitted through the internet network, by DSP installed inside, whereby the fax packet data are converted into analog data so as to be transmitted to a receive party fax through PSTN. In the modem installed in the receive party fax, the received analog data are converted into digital data again to be sent to an inner print. The inner printer installed in the fax outputs contents corresponding to the digital data.

Figure 3:
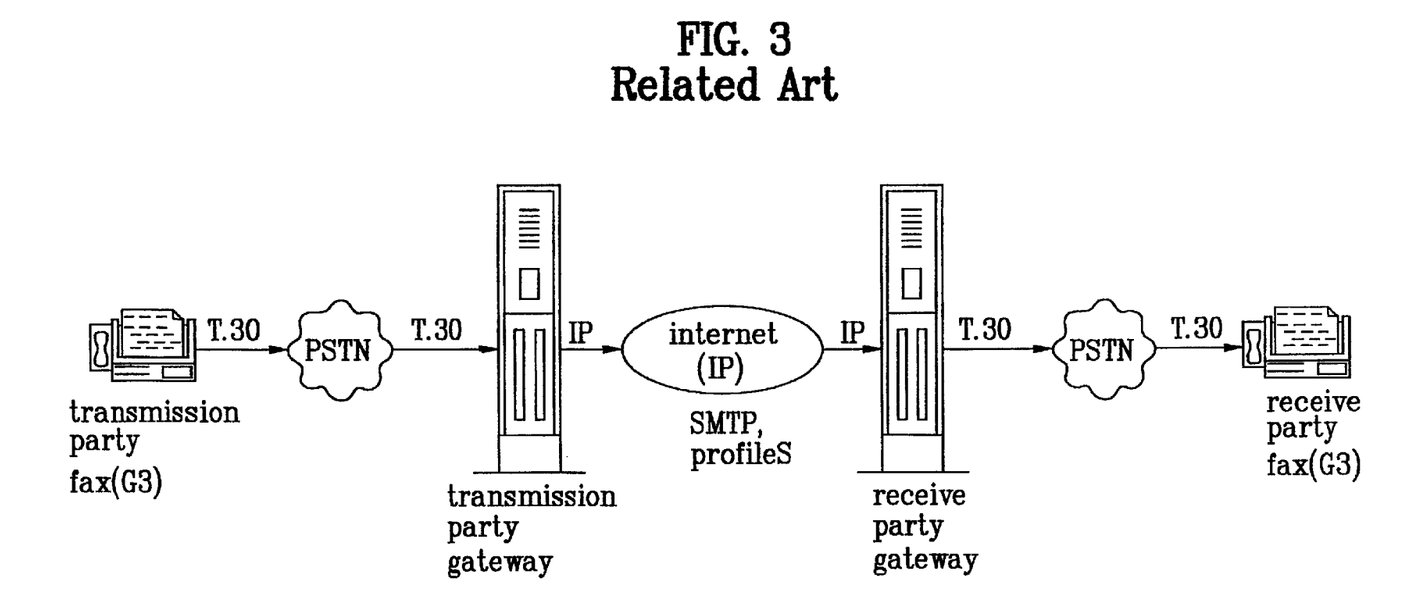
FIG. 3 shows a diagram for explaining the store-forward transmission method.

FIG. 3 shows a diagram for explaining the store-forward transmission method. Referring to FIG. 3, the transmission party fax transmits the fax data to the gateway of the transmission party using PSTN with T.30 protocol.

The gateway of the transmission party stores the fax data received from the transmission party fax in inner memory first, and then transmits the stored fax data to the gateway of the receive party through the internet network.

In this instance, SMTP(simple mail transport protocol) is used for transmitting the fax data by the store and forward transmission method through the internet network. In this case, the transmitted fax data are encoded as MIME (multipurpose internet mail extension) by using TIFF-F (tagged image file format-class F).

Then, the gateway of the receive party completes the fax data transmission process using the internet network by transmitting the fax data received through the internet network back to the receive party fax through PSTN.

Figure 4:
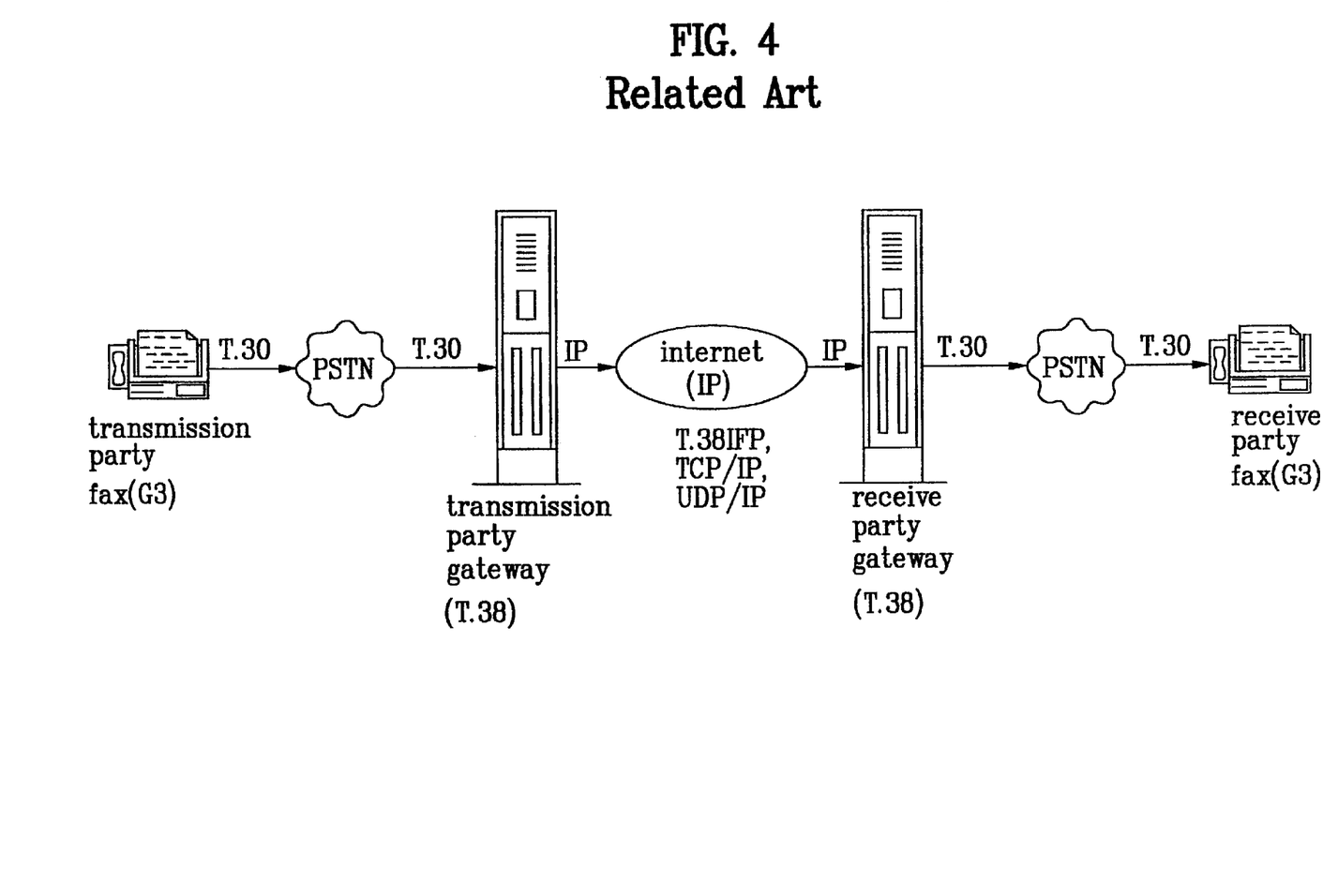
FIG. 4 shows a diagram for explaining the real-time transmission method.

FIG. 4 shows a diagram for explaining the real-time transmission method. Referring to FIG. 4, the transmission party fax transmits the fax data to the gateway of the transmission party through PSTN by T.30 protocol.

The gateway of the transmission party converts T.30 protocol into T.38 protocol and then transmits the fax data to the gateway of the receive party using the internet network.

In this case, in order to transmit the fax data through the internet network by the real-time transmission method, fax data are transmitted by IFP(internet fax protocol) and TCP/IP, or IFP and UDP/IP prescribed in T.38.

Then, the gateway of the receive party completes the fax data transmission process using the internet network by converting the T.38 protocol into the T.30 protocol and then by transmitting the fax data received to the receive party fax through PSTN.

As mentioned in the above explanation, the gateways according to the related art fail to ascertain whether the transmitted fax data are transferred to the gateway of the receive party correctly as well as the transmission time of the transmitted fax data when the fax data are being transmitted/received through the internet network.

Unfortunately, the related art provides poor reliance of he fax data transmission.

SUMMARY OF THE INVENTION

Accordingly, the present invention is directed to an internet fax system that substantially obviates one or more problems due to limitations and disadvantages of the related art.

An object of the present invention is to provide an internet fax system enabling to ascertain the transmission result when fax data are transmitted.

Another object of the present invention is to provide an apparatus for ascertaining a transmission result for an internet fax which enables to ascertain the transmission result when fax data are transmitted.

A further object of the present invention is to provide a method of running an internet fax network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an internet fax system includes a fax machine, a transmission result ascertaining module producing a transmission message used for ascertaining a transmission result on a basis of transmission information and a return message used for ascertaining the transmission result on a basis of receive information, and a gateway transmitting the transmission message to a receive party through the internet network from the fax machine when transmitting and the return message and fax data from a transmission party to the fax machine when receiving.

In another aspect of the present invention, an apparatus for ascertaining a transmission result for an internet fax includes a message producing module producing a transmission message for transmission fax data and a return message ascertaining a transmission result of received fax data, a message adding module adding the produced transmission message to control information of the fax data, a message separating module separating the return message from the control information of the received fax data, a result transmitting module transmitting transmission information and the transmission result of the transmission fax data, and a message return module transmitting the return message including receive information provided by a receive party fax machine and a receive party gateway to a transmission party fax machine.

In a further aspect of the present invention, for a network including a transmission party fax machine, a transmission party gateway, a receive party gateway, and a receive party fax machine, a method of running a internet fax network includes the steps of transmitting fax data from the transmission party fax machine to the transmission party gateway, producing a transmission message containing transmission information in the transmission party gateway and transmitting the transmission message with the fax data to the receive party gateway, interpreting the transmission message by the receive party gateway, changing a transmission fax number and a receive fax number in the transmission message, and recording a loss packet count of the received fax data in the transmission message, transmitting the received fax data from the receive party gateway to the receive party fax machine and recording a fax receive time in the transmission message, producing a return message finally by ascertaining a trans mission result of the fax data from the receive party fax machine by the receive party gateway and by recording the transmission result in the transmission message, transmitting the return message from the receive party gateway o the transmission party gateway, and interpreting the return message by the transmission party gateway and transmitting a result of the interpretation to the transmission party fax machine.

In a more further aspect of the present invention, a message format for an internet fax includes a region in which a transmission party number is recorded, a region in which a receive party number is recorded, a region in which a transmission time for transmitting fax data from the receive party gateway to a receive party fax machine is recorded, a region in which a fax receive time for receiving the fax data in the receive party gateway is recorded, a region in which a characteristic value assigned for discerning whether the message is the transmission message or return message is recorded, and a region in which a final result for transmission success of failure of the fax data is recorded.

In order to achieve the above objects, the present invention is characterized in that a transmission party fax produces a transmission message to ascertain a transmission result and sending the message, which are transmitted with fax, to a fax gateway of a receive party data through an internet network.

When the fax data are received, the fax gateway of the receive party sends the gateway of the transmission party a receive message containing information of receive time and state of the fax data.

Therefore, the fax gateway of the transmission party enables to ascertain the transmission state and time of the transmitted fax data.

According to an embodiment of the present invention, a transmission result ascertaining module produces a transmission message used for ascertaining a transmission result on a basis of transmission information and a return message used for ascertaining the transmission result on a basis of receive information.

A fax interface unit installed in the transmission party gateway constructs fax data by adding the transmission message transferred from the transmission result ascertaining module to control information of the transmission fax data and then disassembles the fax data into packets. When receiving the fax data, the receive party gateway produces fax data by assembling the received packets and transfers the transmission message, which has been added to the control information and is extracted from he assembled fax data, to the transmission result ascertaining module.

The transmission result ascertaining module produces a return message on the basis of he transmission message and then transfers the return message to the transmission party gateway. In case that the return message is identical to the transmission message transmitted when the fax data are transmitted, the transmission party gateway converts contents of the return message into fax data and then transmits the fax data to the transmission party fax machine.

In this case, the message includes the transmission party fax number, receive party fax number, fax transmission time at which the gateway of the transmission party completes to receive the fax data from the fax machine of the transmission party, message identifier representing the characteristic value assigned for distinguishing the transmission message and the return message from the receive party, and transmission state.

Preferably, whether the return message is identical to the transmission message transmitted when the fax data are transmitted is ascertained by storing a message identifier corresponding to the transmission message when outputting the disassembled packets of the fax data and then by comparing the message identifier of the return message to the other message identifier stored in the memory.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE INVENTION

Reference will now be made in detail to the preferred embodiments of the present invention, examples of which are illustrated in the accompanying drawings.

As mentioned in the foregoing explanation, the gateways for internet faxes are characterized in producing a message enabling to ascertain a transmission result of the transmitted fax data.

Figure 5:
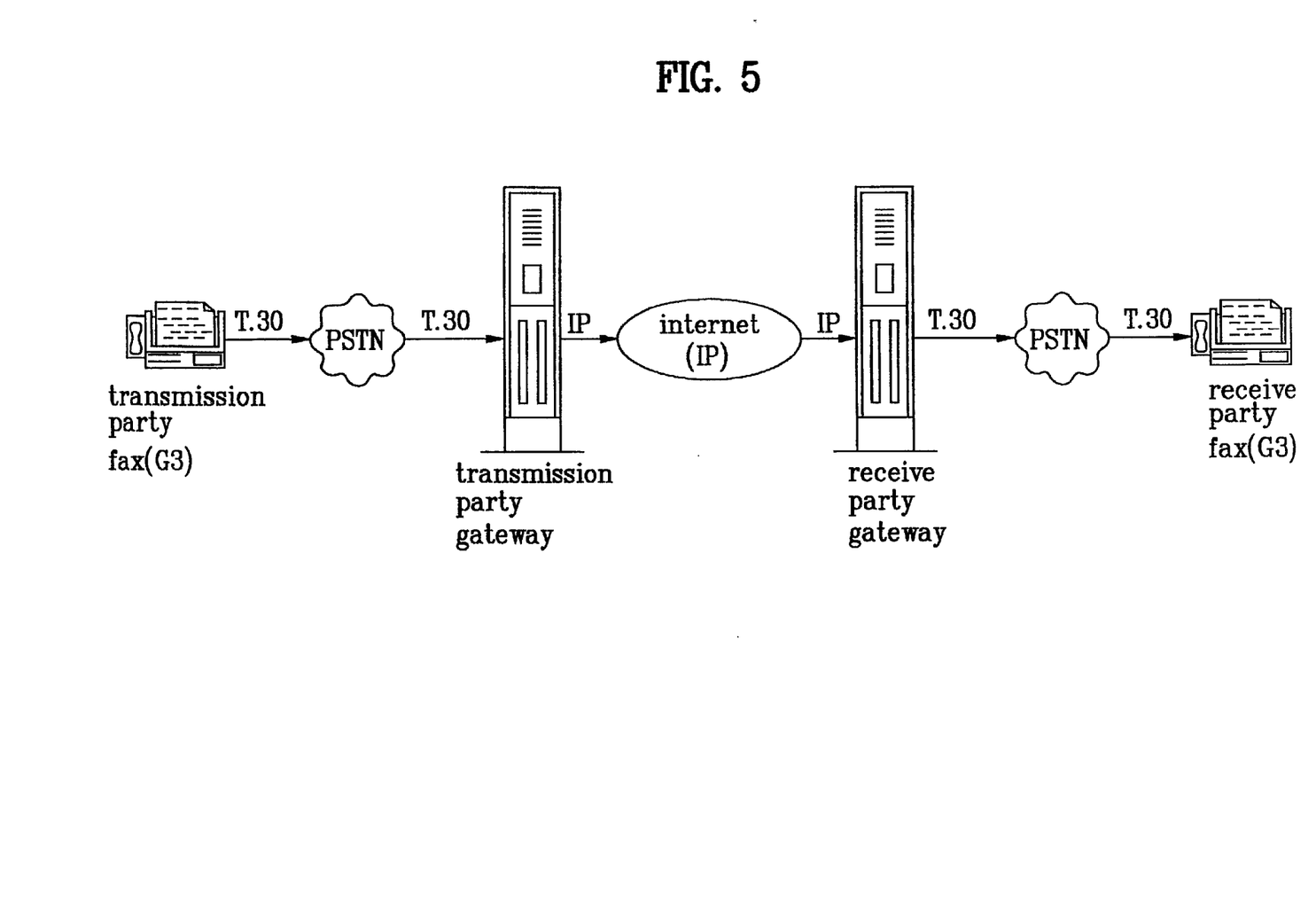
FIG. 5 shows a process of transmitting fax data using internet network according to the present invention.

FIG. 5 shows a diagram to illustrate a process of transmitting/receiving fax data using internet protocol network according to the present invention.

Referring to FIG. 5, a fax of a transmission party is connected to a gateway of the transmission party through PSTN, the gateway of the transmission party is connected to a gateway of a receive party through internet protocol network, and the gateway of the receive party is connected to a fax of the receive party through the PSTN.

A transmission result ascertaining module for an internet fax according to the present invention may be installed at the gateway of the internet fax or realized as an additional exclusive device.

The transmission result ascertaining module for an internet fax as the additional exclusive device may be placed between the fax and gateway for the internet fax. In the following description of an embodiment of the present invention, the transmission result ascertaining module for an internet fax is installed at the gateway. As the fax is a well-known device, whereby the description of the fax will be skipped in the following description.

Figure 6:
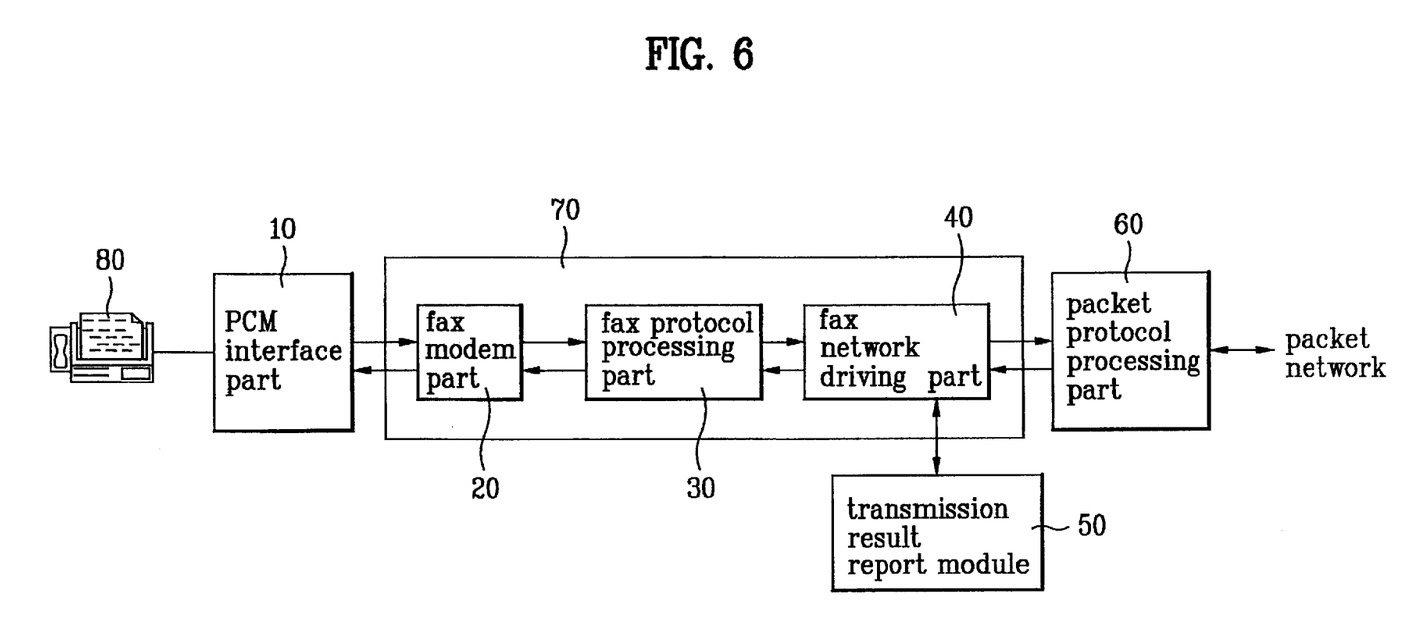
FIG. 6 shows a block diagram of gateways and a module for ascertaining a transmission result for internet faxes according to the present invention.

FIG. 6 shows a block diagram of gateways and a module for ascertaining a transmission result for internet faxes according to the present invention.

Referring to FIG. 6, the gateway includes a PCM interface part 10 and a fax interface unit(FIU) 70.

The fax interface unit 70 includes a fax modem part 20, a fax protocol processing part 30, and a fax network driving part 40.

The fax modem part 20 inputs a PCM fax data transmitted from a fax 80 through the PCM interface part 10 by 64 kbps, and converts the PCM fax data having been inputted from the PCM interface part 10 into a proper form for a transmission device on the basis of the presently-established modulation mode.

Moreover, the fax modem part 20 detects errors by carrying out a function of transmission error detection by CRC(cyclic redundancy check).

In this case, in order to convert the PCM fax data having been inputted from the PCM interface part 10 into a proper form for a transmission device, the fax modem part 20 supports a V.21 interface for modulating and demodulating binary signals of 300 bps, a V.27 interface for modulating and demodulating high speed data of 2400/4800 bps, a V.29 interface for modulating and demodulating high speed data of 7200/9600 bps, a V.17 interface for modulating and demodulating binary signals of 7200/9600/12000/14400 bps, and a V.33 interface for modulating and demodulating binary signals of 12000/14400 bps.

Further, the fax modem part 20 supports a HDLC(high-level data link control) transmission control procedure which enables to transfer consecutive information using command and response belonging to control information in a frame by dividing information of random bit length by transmission control unit called frame.

The fax protocol processing part 30 carries out a protocol processing by which an order of packets stored in a buffer in receive order is arranged, and compensates timing and lost packets due to a packet network.

While a local fax is waiting a response, the fax protocol processing part 30 prevents time-out due to other HDLC flags. And, the fax protocol processing part 30 transmits CRF(command repeat frame) again when time-out occurs due to the absence of the response from a remote fax.

The fax network driving part 40 constructs fax data for transmission by adding the message contents produced by the transmission result ascertaining module 50 to the control information of the transmission fax data transferred from the fax protocol processing part 30.

The above-constructed fax data are disassembled into packets and then outputted to the internet network through the packet protocol processing part 60.

In this case, the fax network driving part 40 stores corresponding message identifiers in predetermined areas of a memory(not shown in the drawing) when the fax packets are outputted to the internet network through the packet protocol processing part 60.

In the mean time, the fax network driving part 40, when the transmission messages returns form the receive part, ascertains a result of the transmitted fax data transmission by comparing the message identifier contained in the returning transmission message to the other message identifier stored in the memory.

Described is the receive operation of the internet fax transmission result ascertaining module 50 and the fax interface unit installed inside the gateway as follows.

The fax network driving part 40 restores the fax data by collecting selectively the fax packets received from the internet network through the packet protocol processing part 60.

Successively, the fax network driving part 40 extracts the message information added to the control information of the received fax data. In this case, the extracted message contents are applied to the transmission result ascertaining module 50, while the received fax data are applied to the fax protocol processing part 30.

Meanwhile, the transmission result ascertaining module 50, when transmitting the fax data, produces a message to be used for ascertaining the transmission result of the fax data by being added to the fax data. Then, the transmission result ascertaining module 50 applies such a message to the fax network driving part 40.

On the other hand, the transmission result ascertaining module 50, when receiving the fax data, produces a message to be transferred back to the fax of the transmission party having transferred the fax data in accordance with the receive time and state of the fax data. Then, the transmission result ascertaining module 50 applies this message to the fax network driving part 40.

Figure 7:
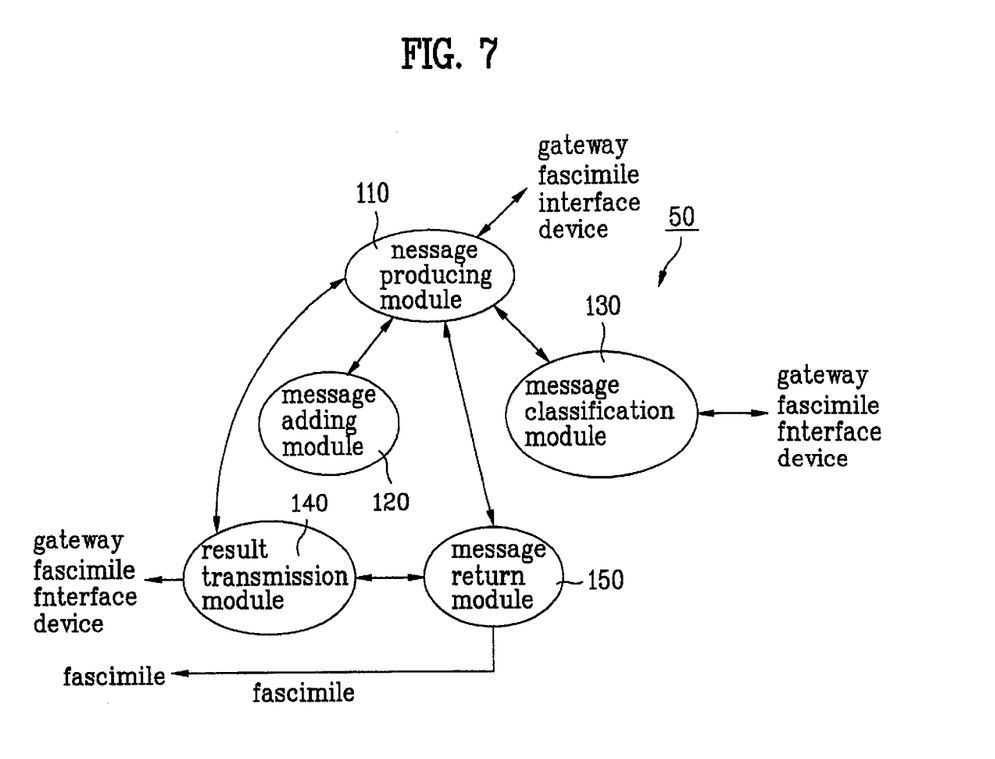
FIG. 7 shows the construction of an apparatus for ascertaining a transmission result for an internet fax according to the present invention.

FIG. 7 shows a diagram in detail for the construction of the transmission result ascertaining module 50.

Referring to FIG. 7, the transmission result ascertaining module 50 includes a message producing module 110, a message adding module 120, a message separating module 130, a transmission-result transmitting module 140, and a message returning module 150.

The message producing module 110 produces a message having a specific form about the fax data. Contents of the produced message improve transmission reliance and user's handling convenience, thereby being added or reduced according to the fax service contents or user's demand.

The message adding module 120 adds the produced message to the control information of the fax data.

The message separating module 130 separates the message from the control information in the received packets.

The result transmitting module 140 transfers a transmission result containing the transmission/non-transmission and transmission time of the fax data to the gateway of the transmission party.

The message returning module 150 transfers the message, which contains receive information, having been returned from the gateway of the receive party to a fax machine of the transmission party.

Figure 8:
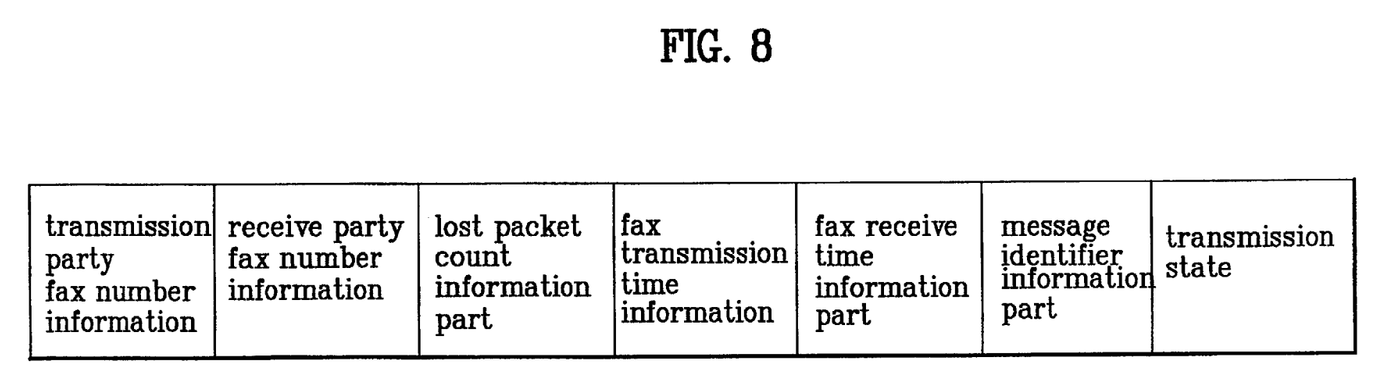
FIG. 8 shows a diagram of formatting messages produced by the apparatus for ascertaining a transmission result in FIG. 6.

FIG. 8 shows a diagram of formatting two kinds of messages produced by the transmission result ascertaining module 50 in FIG. 6.

Referring to FIG. 8, the formats of the messages are identical and include regions of transmission party fax number, receive party fax number, loss packet count, fax transmission time, message identifier, and transmission state.

The transmission party fax number has an E.164 numbering system. When the message is a return message, the transmission party number is actually the receive party fax number.

The receive party fax number has an E.164 numbering system. When the message is a return message, the receive party number is actually the receive party fax number.

The loss packet count designates a count of loss packets collected by the gateway of the receive party so as to judge whether the fax data are normally transmitted. The loss packet count is found out by analyzing the received packets in the gateway of the receive party.

The fax transmission time designates the time taken for transferring the fax data, which are transmitted from the fax machine of the transmission party through the gateway of the transmission party, from the gateway of the receive party to the fax machine of the receive party. The gateway of the transmission party is informed of this transmission time.

The fax receive time designates the time taken for receiving the fax data from the gateway of the receive party. A time taken for transferring this receive time may vary according to the state of the network.

The message identifier designates its characteristic value allotted assigned for distinguishing whether the message is the transmission message or return message. Namely, this information contains an identification number and message kind of the gateway of the transmission party.

Finally, the transmission state designates the final result of success or failure of the fax data transmission, thereby indicating "OK" or "not OK".

Therefore, when the fax data are transmitted, the transmission result ascertaining module 50 stores a fax number corresponding to itself in the fax number region of the transmission party, the receive party fax number in the fax number region of the receive party, a time for completing to receive the fax data from the fax machine of the transmission party to the gateway corresponding itself in the fax transmission time region, and the characteristic value to discern the return or transmission message in the message identifier region.

The transmission message is produced by storing null values in the loss packet count region, fax receive time region, and transmission state region.

When the fax data are received, the transmission result ascertaining module 50 re-establishes the transmission fax number and receive fax number by substituting data in the transmission party fax number region and receive party fax number region.

Meanwhile, the transmission result ascertaining module 50 collects a count of loss packets at the time point of completing to receive the fax data from the gateway of the transmission party and then stores the collected information in the loss packet count region.

And, the transmission result ascertaining module 50 produces the return message by storing the time, which is taken for the fax data transmission from the gateway of the receive party to the fax machine of the receive party, in the fax receive time region.

Figure 9:
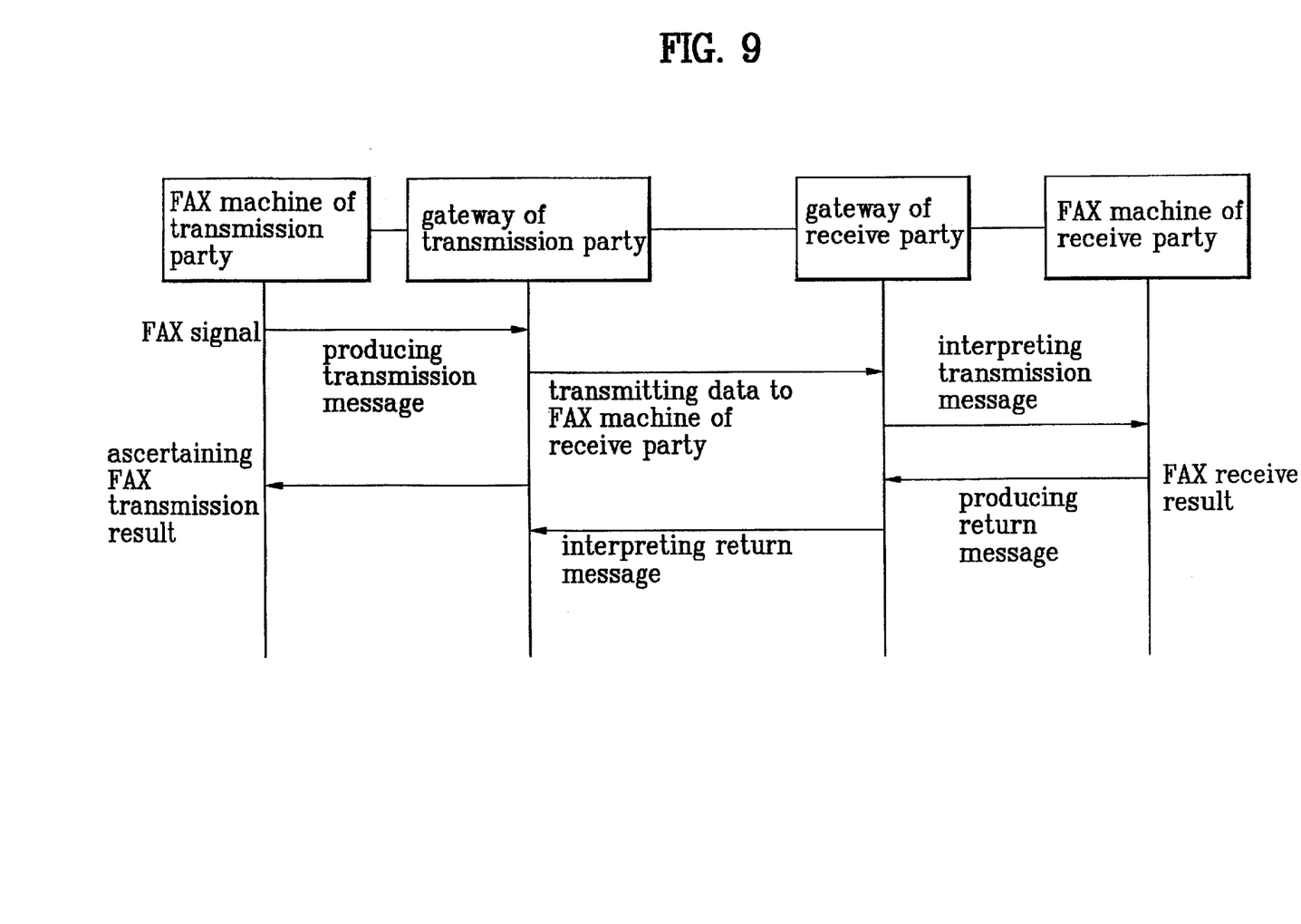
FIG. 9 shows a diagram of running an internet fax network according to the present invention.

FIG. 9 shows a flow diagram of transmitting the produced messages through the internet protocol networks according to the present invention.

Referring to FIG. 9, the fax machine of the transmission party transfers normal fax data to the gateway of the transmission party. In the mean time, the gateway of the transmission party produces a transmission message containing transmission information and then transfers the transmission message to the gateway of the receive party.

The gateway of the receive party interprets the transmission message, changes the transmission fax number and the receive number as well as records the receive time and the loss packet count in the regions into which the null information is inserted.

Subsequently, the gateway of the receive party transfers the received fax data to the fax machine of the received party as well as records the fax transmission time in the message.

The gateway of the receive party ascertains the transmission result of the fax data from the fax machine, and records the transmission result in the transmission state region in the transmission message. Then, the gateway of the receive party finally produces the return message and transfers the produced return message to the gateway of the transmission party.

The gateway of the transmission party interprets the return message and transfers the interpreted result to the fax machine of the transmission party.

The entire process of transferring fax data using internet networks according to the present invention will be explained by referring to FIGS. 5 to FIGS. 9 in the following description. Receiving PCM data transmitted by 64 kbps from the fax machine of the transmission party through the PCM interface part 10, the fax modem part 20 of the gateway of the transmission party converts the PCM data into a form proper for the transmission and then transfers the converted data to the fax network driving part 40 through the fax protocol processing part 30.

Once the gateway of the transmission party completes the receive of the fax data from the fax machine of the transmission party, the transmission result ascertaining module 50 produces the transmission message containing the transmission party fax number, receive party fax number, the fax transmission time at which the gateway of the transmission party completes to receive the fax data from the fax machine of the transmission party, and the message identifier representing the characteristic value assigned for distinguishing the transmission message and the return message from the receive party. This trans message is applied to the fax network driving part 40.

As mentioned in the above description, the fax network driving part 40, which receives the fax data from the fax protocol processing part 30 and the transmission message from the transmission result ascertaining module 50, constructs control information by adding the transmission message received from the transmission result ascertaining module 50 to the fax data received from the fax protocol processing part 30. Thus, data added to the control information are the transmission party fax number, receive party fax number, fax transmission time, and message identifier.

And, the fax network driving part 40, which constructs the control information by adding the transmission message received from the transmission result ascertaining module 50 to the fax data received through the fax protocol processing part 30, disassembles the fax data into packets.

The packets are outputted to the internet network through the packet protocol processing part 60. In the mean time, when the fax packets are outputted to the internet network through the packet protocol processing part 60, the fax network driving part 50 stores the message identifier, which indicates that the message is the transmission message, in a predetermined region of the memory located inside.

Meanwhile, the fax network driving part 50 of the fax interface unit in the gateway of the receive party produces the fax data by assembling the fax packets transmitted from the internet network. Then, the fax network driving part 50 extracts the transmission message added to the control information of the fax data transmitted from the gateway of the transmission party.

As mentioned in the above description, the transmission message extracted from the fax network driving part 40 is applied to the transmission result ascertaining module 50, while the fax data except the transmission message are transferred to the fax modem part 20 through the fax protocol processing part 30.

The fax modem part 20 having received the fax data through the fax protocol processing part 30 treats the processing of the received fax data and then transfers the processed data to the fax machine of the receive party through the PCM protocol processing part 10.

Meanwhile, the transmission result ascertaining module 50 having received the transmission message from the fax network driving part 40 collects the loss packet count at the time by which the gateway of the receive party completes to receive the fax data from the gateway of the transmission party.

Successively, the transmission result ascertaining module 50 stores the loss packet count in the corresponding region of the transmission message to produce the return message and the time, by which the gateway of the receive party completes to transmit the fax data to the fax machine of the receive party, in the fax receive time region.

The transmission result ascertaining module 50 substitutes the values stored in the transmission fax number region and the receive fax number region of the transmission message with new values. Namely, the numbers of the receive party fax machine and the transmission party fax machine are stored practically in the transmission fax number region and the receive fax number region, respectively.

By re-establishing the transmission and receive fax numbers, the return message to be transferred to the transmission party is produced and then the produced return message is transferred to the fax network driving part 40.

As mentioned in the above description, the fax network driving part 40 having received the return message from the transmission result ascertaining module 50 disassembles the return message into packets and then outputs the packets to the internet network through the packet protocol processing part 60.

And, the gateway of the transmission party having received the message packets from the gateway of the receive party through the internet network assembles the received return message packets and then compares the message identifier stored in the message identifier region of the return message to the other message identifier stored in the memory when transmitting the transmission message.

After the comparison, when the message identifiers are identical each other, the gateway of the transmission party converts the transmission result received from the receive party into fax data and then transmits the fax data to the fax machine of the transmission party.

Accordingly, in the present invention, a transmission message produced when fax data are transmitted is transferred to the receive party with the fax data, and a return message including information about the receive time and state according to the fax data is received from the receive party.

Therefore, the transmission party fax machine enables to ascertain the transmission state and time of the fax data sent from itself.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus of ascertaining a transmission result for an internet fax comprising:

a message producing module producing a transmission message for transmission fax data and a return message ascertaining a transmission result of received fax data;

a message adding module adding the produced transmission message to control information of the fax data;

a message separating module separating the return message from the control information of the received fax data;

a result transmitting module transmitting transmission information and the transmission result of the transmission fax data; and a message return module transmitting the return message including receive information provided by a receive party fax machine and a receive party gateway to a transmission party fax machine, wherein at least one of the transmission and return messages comprises a loss packet count region for recording transmission loss information.

2. The apparatus of claim 1, wherein the transmission message and return message include a transmission party fax number region, receive party fax number region, loss packet count region, fax transmission time region, message identifier region, and transmission state region, respectively.

3. The apparatus of claim 2, wherein the regions of the messages are increased or decreased by a user's demand.

4. The apparatus of claim 1, wherein the apparatus is located in the transmission party gateway.

5. The apparatus of claim 1, wherein the apparatus is located outside the transmission party gateway.

6. An Internet fax system comprising:

a fax machine;

a transmission result ascertaining module producing a transmission message used for ascertaining a transmission result on a basis of transmission information and a return message used for ascertaining the transmission result on a basis of receive information; and a gateway transmitting the transmission message to a receive party through the internet network from the fax machine when transmitting and the return message and fax data from a transmission party to the fax machine when receiving wherein at least one of the transmission and return messages comprises a loss packet count region for recording transmission loss information.

7. The internet fax system of claim 6, the gateway comprising:

a pulse code modulation(PCM) interface part;

a fax modem part inputting PCM fax data transmitted from a fax machine through the PCM interface part and converting the PCM data into a form proper for a transmission apparatus on a basis of a presently-established modulation mode;

a fax protocol part storing packets in a buffer in receiving order, the fax protocol part carrying out a protocol of arranging an order of the stored packets, the fax protocol part compensating lost packets and timing;

a fax network driving part constructing fax data for transmission by adding contents of the transmission message produced by the transmission result ascertaining module to control information of the transmission fax data transmitted from the fax protocol processing part and then disassembling the fax data into packets; and a packet protocol processing part outputting the packets to the internet network.

8. The internet fax system of claim 7, wherein the fax network driving part includes a memory storing a corresponding message identifier when the fax packets are outputted to the internet network through the packet protocol processing part.

9. The internet fax system of claim 7, wherein the fax modem part has a function of detecting transmission errors by CRC (cyclic redundancy check).

10. The internet fax system of claim 7, wherein the fax modem part, in order to convert the PCM fax data having been inputted from the PCM interface part into a proper form for a transmission device, supports a V.21 interface for modulating and demodulating binary signals of 300 bps, a V.27 interface for modulating and demodulating high speed data of 2400/4800 bps, a V.29 interface for modulating and demodulating high speed data of 7200/9600 bps, a V.17 interface for modulating and demodulating binary signals of 7200/9600/12000/14400 bps, and a V.33 interface for modulating and demodulating binary signals of 12000/14400 bps.

11. The internet fax system of claim 7, wherein the fax protocol processing part operates to prevent time-out due to other flags While a local fax is waiting a response and transmits CRF(command repeat frame) again when time-out occurs due to the absence of the response from a remote fax.

12. In a network including a transmission party fax machine, a transmission party gateway, a receive party gateway, and a receive party fax machine, a method of running an internet fax network comprising the steps of:

transmitting fax data from the transmission party fax machine to the transmission party gateway;

producing a transmission message containing transmission information in the transmission party gateway;

transmitting the transmission message with the fax data to the receive party gateway;

interpreting the transmission message by the receive party gateway;

changing a transmission fax number and a receive fax number in the transmission message;

recording a loss packet count of the received fax data in the transmission message;

transmitting the received fax data from the receive party gateway to the receive party fax machine and recording a fax receive time in the transmission message;

producing a return message finally by ascertaining a transmission result of the fax data from the receive party fax machine by the receive party gateway and by recording the transmission result in the transmission message;

transmitting the return message from the receive party gateway o the transmission party gateway;

interpreting the return message by the transmission party gateway; and transmitting a result of the interpretation to the transmission party fax machine.

13. The method of claim 12, the step of interpreting the return message comprising the steps of:

storing the message identifier of he transmission message in a memory of the transmission party gateway when the fax data are transmitted from he transmission party gateway to the receive party gateway;

comparing in the transmission party gateway a message identifier included in the return message from the receive party gateway to the message identifier stored in the memory; and ascertaining whether the two messages are identical by a result of the comparison.

14. The method of claim 12, wherein the transmission message is included in control information of the fax data for transmission and then outputted to the internet network by being disassemble into packet data.

15. The method of claim 12, wherein the return message is included in control information from the receive party gateway and then outputted to the internet network by being disassemble into packet data.

16. The method of claim 12, wherein the transmission message and return message include a transmission party fax number region, receive party fax number region, loss packet count region, fax transmission time region, message identifier region, and transmission state region, respectively.

17. Logic code executable by a processor for ascertaining transmission results of a fax transmission based on content of a message a region in which a transmission party number is recorded;

a region in which a receive party number is recorded;

a region in which a loss packet count is recorded;

a region in which a transmission time for transmitting fax data from the receive party gateway to a receive party fax machine is recorded;

a region in which a fax receive time for receiving the fax data in the receive party gateway is recorded;

a region in which a characteristic value assigned for discerning whether the message is the transmission message or return message is recorded; and a region in which a final result for transmission success of failure of the fax data is recorded.

18. The logic code for an internet fax of claim 17, wherein null bits are inserted in the loss packet count region, fax receive time region, and transmission state region when the message format is a message for transmission.

19. The logic code for an internet fax of claim 17, wherein a receive party fax machine number and a transmission party fax machine number are stored practically in the transmission fax number region and the receive fax number region, respectively when the message format is a return message.

20. The logic code for an internet fax of claim 17, wherein the message identifier practically includes an identifier of a gateway of a party transmitting the message and species of the message.

* * * * *